(12) United States Patent
Wang et al.

(10) Patent No.: US 9,594,617 B2
(45) Date of Patent: Mar. 14, 2017

(54) METHOD AND APPARATUS FOR POSITIONING CRASH

(71) Applicant: Beijing Qihoo Technology Company Limited, Beijing (CN)

(72) Inventors: Guotao Wang, Beijing (CN); Qingping Liu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/648,605

(22) PCT Filed: Sep. 27, 2013

(86) PCT No.: PCT/CN2013/084394
§ 371 (c)(1),
(2) Date: May 29, 2015

(87) PCT Pub. No.: WO2014/082495
PCT Pub. Date: Jun. 5, 2014

(65) Prior Publication Data
US 2015/0317232 A1    Nov. 5, 2015

(30) Foreign Application Priority Data

Nov. 29, 2012 (CN) .......................... 2012 1 0500909

(51) Int. Cl.
*G06F 11/00* (2006.01)
*G06F 11/07* (2006.01)

(52) U.S. Cl.
CPC ...... *G06F 11/0778* (2013.01); *G06F 11/0706* (2013.01)

(58) Field of Classification Search
CPC ............... G06F 11/0778; G06F 11/079; G06F 11/3466; G06F 11/3471; G06F 11/3495;
(Continued)

(56) References Cited

U.S. PATENT DOCUMENTS

| 5,850,562 A | 12/1998 | Crump et al. |
| 6,728,907 B1 * | 4/2004 | Wang .................... G06F 11/073 714/2 |

(Continued)

FOREIGN PATENT DOCUMENTS

| CN | 101286130 | 10/2008 |
| CN | 101398781 | 4/2009 |

(Continued)

OTHER PUBLICATIONS

Guo et al., "A Distributed Software Runtime Monitoring Mechanism," Computer & Digital Engineering, vol. 36, No. 11, Nov. 2008, 4 pages.

(Continued)

*Primary Examiner* — Joseph Kudirka
(74) *Attorney, Agent, or Firm* — Harness, Dickey & Pierce, P.L.C.

(57) ABSTRACT

Disclosed are a method and an apparatus for positioning crash, for solving the problem of the prior art that the positioning of the cause of the crash cannot be ensured. The method includes: setting monitoring points in a terminal and a test target in advance; monitoring the operation of the test target, and when the test target crashes, acquiring parameters of the monitoring points and parameter values thereof to generate a mirror file, the parameters of the monitoring points including the parameters of the monitoring points in the test target and in the terminal; acquiring the mirror file and viewing the parameters of the monitoring points in the mirror file and the parameter values thereof; analyzing the parameters of the monitoring points and the parameter values thereof and positioning the cause of the crash of the test target.

15 Claims, 4 Drawing Sheets

(58) Field of Classification Search
CPC . G06F 11/3636; G06F 11/3644; G06F 11/366
See application file for complete search history.

(56) References Cited

U.S. PATENT DOCUMENTS

| | | | | |
|---|---|---|---|---|
| 7,028,056 | B1* | 4/2006 | Hendel | G06F 11/3636 |
| 7,490,268 | B2* | 2/2009 | Keromytis | G06F 11/0742 |
| | | | | 714/38.11 |
| 8,261,242 | B2* | 9/2012 | Booth | G06F 11/3624 |
| | | | | 717/126 |
| 9,158,661 | B2* | 10/2015 | Blaine | G06F 11/3648 |
| 2002/0087949 | A1* | 7/2002 | Golender | G06F 9/4446 |
| | | | | 717/124 |

FOREIGN PATENT DOCUMENTS

| | | |
|---|---|---|
| CN | 103034575 | 4/2013 |
| CN | 103049373 | 4/2013 |

OTHER PUBLICATIONS

Li et al., "A Trustworthy Behavior Model for Software Monitoring Point Based on Classification Attributes," Journal of Electronics & Information Technology, vol. 34, No. 6, Jun. 2012, 7 pages.

* cited by examiner

METHOD AND APPARATUS FOR POSITIONING CRASH

This application claims the benefits of Chinese Patent Application No. 201210500909.4 titled as "METHOD AND APPARATUS FOR POSITIONING CRASH", filed in Chinese Patent Office on Nov. 29, 2012, which is hereby incorporated by reference herein in its entirety.

FIELD OF THE INVENTION

The present application relates to computer software technology, particularly to a method and apparatus for positioning crash.

BACKGROUND OF THE INVENTION

Software is a set of a series of computer data and instructions organized in a specific order. Generally, software can be divided into system software, application software and middleware which is ranged between them. Software not only includes computer programs running on a computer, but also can include files relating to these computer programs, that is, software can be regarded as an aggregate of programs plus files.

Software is an interface between a user and hardware, that is, the user communicates with the computer through the software. The user can use a computer through software, can surf internet by using software, and also can work by using software. However, software may have a problem of a crash due to certain kinds of causes. Once software crashes, the software may need to await a very long time to continue to be used, even cannot continue to be used. Therefore, a cause why the software crashes needs to be found to determine whether the crash is caused due to a problem in the software, so as to avoid effecting using of a user by the crash caused due to the problem of the software.

A method for positioning a crash of a software is to acquire a DUMP file of a software which has crashed, that is, a mirror file of the process of the software, then to open the mirror file by using a analysis tool such as windbg, by the analysis tool, relevant data of the process such as loading of a library capable of being viewed, and further to position the cause of the crash. But if the cause of the crash cannot be positioned through the above mentioned relevant data of the process, a more complicated analysis such as viewing a stack needs to be performed.

In the above mentioned method, the relevant data of the process of the software need to be viewed when performing positioning, and even relevant data of the stack in the software need to be analyzed. Therefore, it takes a relatively long time to position the cause of the crash and the efficiency is relatively low.

Furthermore, some crashes are not caused due to the software per se and it is very difficult to analyze the cause of this kind of crashes by adopting the above mentioned method. Therefore, the above mentioned method cannot ensure the positioning of the cause of the crash.

SUMMARY OF THE INVENTION

In view of the above described problem, the present application is proposed in order to provide an apparatus for positioning a crash and a corresponding method for positioning a crash for overcoming the above described problem or at least partly solving the above described problem.

In accordance with an aspect of the present application, there is provided a method for positioning crash, including: setting monitoring points in a terminal and a test target in advance;
monitoring the operation of the test target, and when the test target crashes, acquiring parameters of the monitoring points and parameter values thereof to generate a mirror file, the parameters of the monitoring points including the parameters of the monitoring points in the test target and in the terminal;
acquiring the mirror file and viewing the parameters of the monitoring points in the mirror file and the parameter values thereof; and
analyzing the parameters of the monitoring points and the parameter values thereof, to position the cause of the crash of the test target.

In an embodiment of the present application, the analyzing the parameters of the monitoring points and the parameter values thereof, to position the cause of the crash of the test target includes: classifying the parameters of the monitoring points and analyzing the parameter values of individual parameters, to position the cause of the crash of the test target.

In an embodiment of the present application, the mirror file further includes crash addresses; the classifying the parameters of the monitoring points and analyzing the parameter values of individual parameters, to position the cause of the crash of the test target includes: classifying the parameters of the monitoring points in the test target in accordance with the crash addresses, to determine the crash addresses corresponding to the parameters of each monitoring point in the test target; analyzing, for each crash address, the parameter values corresponding to the parameters of the monitoring points in the test target at the crash address, and positioning the cause of the crash of the test target in combination with the parameter values corresponding to the parameters of the monitoring points in the terminal.

In an embodiment of the present application, the monitoring the operation of the test target in the terminal includes: the monitoring the operation of the test target includes: monitoring the monitoring points in the test target by using the parameters of the monitoring points through a monitoring interface and generating the parameter values corresponding to the parameters of the monitoring points in the test target; and monitoring the monitoring points in the terminal by using the parameters of the monitoring points through the monitoring interface and generating the parameter values corresponding to the parameters of the monitoring points in the terminal.

In an embodiment of the present application, when the test target crashes, the acquiring parameters of the monitoring points and parameter values thereof to generate a mirror file includes: when the test target crashes, acquiring, through the monitoring interface, the parameters of the monitoring points in the test target and the current parameter values thereof, and the parameters of the monitoring points in the terminals and the current parameter values thereof; and using the acquired parameters of the monitoring points in the test target and parameter values thereof, and parameters of the monitoring points in the terminals and parameter values thereof, to generate the mirror file.

In an embodiment of the present application, wherein the setting monitoring points in the terminal and the test target in advance includes: analyzing the cause of the crash of the test target in advance, to determine the key positions on which the test target might crash; and setting monitoring points on the key positions.

In an embodiment of the present application, the test target is a browser, the setting monitoring points in the terminal and the test target in advance includes: analyzing the cause of the crash of the browser in advance, to determine the key positions on which the browser might crash; and setting monitoring points on the key positions, the key positions include at least one item of the following: the process, the thread, the function of the browser and the memory data of the terminal where the browser is located.

In an embodiment of the present application, the test target is a browser, the mirror file further includes crash addresses; the analyzing the parameters of the monitoring points and the parameter values thereof, to position the cause of the crash of the test target includes: classifying the monitoring points in the browser in accordance with the crash addresses; for each crash address, analyzing the parameters of the monitoring points of the browser and the parameter values thereof, and positioning the cause of the crash of the test target in combination with the parameters of the monitoring points in the terminal and the parameter values thereof.

In an embodiment of the present application, the parameters of the monitoring points in the test target include state parameters of the monitoring points suitable to identify state of the monitoring points when the test target crashes, and the parameters of the monitoring points in the terminal include a total amount of the memory and a usage amount of the memory of the terminal.

In accordance with an aspect of the present application, there is provided an apparatus for positioning a crash, including:
a monitoring point setting module configured to set monitoring points in a test target and a terminal in advance;
a monitoring and generating module configured to monitor the operation of the test target, and when the test target crashes, acquire parameters of the monitoring points and parameter values thereof to generate a mirror file, the parameters of the monitoring points including the parameters of the monitoring points in the test target and in the terminal;
an acquiring and viewing module configured to acquire the mirror file and view the parameters of the monitoring points in the mirror file and the parameter values thereof; and
an analyzing and positioning module configured to analyze the parameters of the monitoring points and the parameter values thereof, to position the cause of the crash of the test target.

In an embodiment of the present application, the analyzing and positioning module is configured to classify the parameters of the monitoring points and analyze the parameter values of individual parameters, to position the cause of the crash of the test target.

In an embodiment of the present application, the mirror file further includes crash addresses; the analyzing and positioning module includes: a classifying module configured to classify the parameters of the monitoring points in the test target in accordance with the crash addresses, to determine the crash addresses corresponding to the parameters of each monitoring point in the test target; and an analyzing module configured to, for each crash address, analyze the parameter values corresponding to the parameters of the monitoring points in the test target at the crash address, and to position the cause of the crash of the test target in combination with the parameter values corresponding to the parameters of the monitoring points in the terminal.

In an embodiment of the present application, the monitoring and generating module includes: a first monitoring module configured to monitor the monitoring points in the test target by using the parameters of the monitoring points through a monitoring interface and generate the parameter values corresponding to the parameters of the monitoring points in the test target; and a second monitoring module configured to monitor the monitoring points in the terminal by using the parameters of the monitoring points through the monitoring interface and generate the parameter values corresponding to the parameters of the monitoring points in the terminal.

In an embodiment of the present application, the monitoring and generating module includes: an acquiring module configured to, when the test target crashes, acquire, through the monitoring interface, the parameters of the monitoring points in the test target and the current parameter values thereof, and the parameters of the monitoring points in the terminals and the current parameter values thereof; and a generating module configured to use the acquired parameters of the monitoring points in the test target and parameter values thereof, and parameters of the monitoring points in the terminals and parameter values thereof, to generate the mirror file.

In an embodiment of the present application, the monitoring point setting module is configured to analyze the cause of the crash of the test target in advance, determine the key positions on which the test target might crash; and set monitoring points on the key positions.

In an embodiment of the present application, the test target is a browser, then the monitoring point setting module is specifically configured to analyze the cause of the crash of the browser in advance, determine the key positions on which the browser might crash, and set monitoring points on the key positions, the key positions include at least one item of the following: the process, the thread, the function of the browser and the memory data of the terminal where the browser is located.

In an embodiment of the present application, the test target is a browser, and the mirror file further includes crash addresses; in the analyzing and positioning module: a classifying module is configured to classify the monitoring points in the browser in accordance with the crash addresses; and an analyzing module is configured to, for each crash address, analyze the parameters of the monitoring points of the browser and the parameter values thereof, and to position the cause of the crash of the test target in combination with the parameter of the monitoring points in the terminal and the parameter values thereof.

In an embodiment of the present application, the parameters of the monitoring points in the test target include state parameters of the monitoring points suitable to identify state of the monitoring points when the test target crashes, and the parameters of the monitoring points in the terminal include a total amount of the memory and a usage amount of the memory of the terminal.

According to the present application, monitoring points are set in a terminal and a test target in advance, the operation of the test target can be monitored, and when the test target crashes, parameters of the monitoring points in the test target and parameter values thereof are acquired to generate a mirror file. Since a large number of monitoring points can be set in the terminal and the software to be tested, a large number of parameters and parameter values thereof can be acquired from the mirror file, so that when performing positioning of a cause of the crash, relatively more data can be analyzed and data that can be analyzed are more adequate, so that the cause of the crash can be positioned quickly. Moreover, parameters of a monitoring point in a terminal and parameter values thereof can be acquired. Therefore, even for a crash caused by a non-test target per se, positioning can be performed as well, so that the positioning the cause of the crash is ensured.

The above explanation is merely an outline of the technical solution of the present application. In order to be able to understand the technical means of the present application more clearly and to be able to implement it in accordance with the contents of the specification, and in order to enable the above and other objects, features and advantages of the present application more evident and comprehensible, the specific embodiments of the present application are particularly described in the following.

BRIEF DESCRIPTION OF DRAWINGS

By reading the following detailed description of the preferred embodiments, various other advantage and benefits will be clear for those ordinary skilled in the art. The drawings are merely used for purpose of illustration of the preferred embodiments and are not considered as limiting of the present application. Further, the same components will be denoted by the same reference symbol throughout the drawings. In the drawings.

DETAILED DESCRIPTION OF THE INVENTION

Below, the exemplary embodiments of the present disclosure will be described further in detail with reference to the drawings. Although the exemplary embodiments of the present disclosure are showed in the drawings, it is to understand that, the present disclosure can be implemented in various forms and shall not be limited by the embodiments here set forth. In contrary, these embodiments are provided in order to make the present disclosure understood more thoroughly and to make the scope of the present disclosure fully transferred to those skilled in the art.

Software is an interface between a user and hardware, that is, the user communicates with the computer through the software. Once software crashes, the software may need to await a very long time to continue to be used, even cannot continue to be used. Therefore, a cause of the crash of the software needs to be found, to determine whether the crash is caused due to a problem in the software, so as to avoid effecting using of a user by the crash caused due to the problem of the software.

In a method for positioning the crash of the software, relevant data of the process of the software need to be viewed when performing positioning, and even relevant data of a stack in the software need to be analyzed. Therefore, it takes a relatively long time to position the cause of the crash and the efficiency is relatively low. Furthermore, some crashes are not caused due to the software per se and it is very difficult to analyze the cause of this kind of crashes by adopting the above mentioned method. Therefore, the above mentioned method cannot ensure the positioning of the cause of the crash.

An embodiment of the present application provides a method for positioning a crash, which can acquire a number of parameters and parameter values thereof from a mirror file, so that when performing positioning of a cause of the crash, relatively more data can be analyzed and data that can be analyzed are more adequate, so that the cause of the crash can be positioned quickly. Moreover, parameters of a monitoring point in a terminal and parameter values thereof can be acquired. Therefore, even for a crash caused by a non-test target per se, positioning can be performed, so that the positioning of the cause of the crash is ensured.

Figure 1:
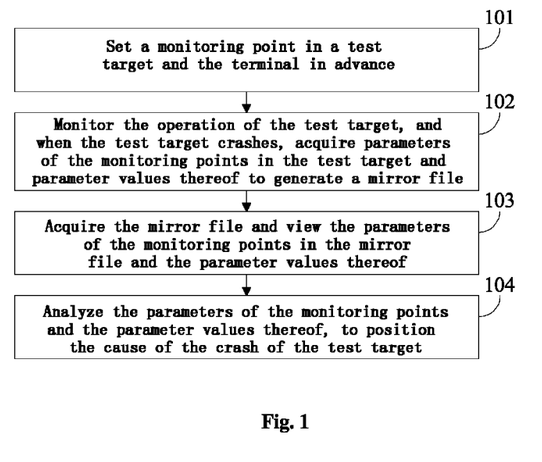
FIG. 1 shows a flowchart of a method for positioning crash provided according to an embodiment of the present application.

FIG. 1 shows a flowchart of a method for positioning crash provided according to an embodiment of the present application.

The step 101 is to set a monitoring point in a test target of the terminal in advance.

Software in the terminal may have a problem of the crash due to various kinds of causes. In order to find the cause of the crash of software, software can be made as a test target and then a monitoring point is set in the terminal and the test target, so as to monitor the test target in real time through the monitoring point along with the operation of the software.

Wherein, one or more parameters can be set for each monitoring point. Along with the performing of the test target, the parameter(s) of the monitoring point generates corresponding parameter value(s). Therefore, a number of monitoring points can be set in terminal and software to be tested, for monitoring positions in the terminal and software to be tested, such as processes, threads, functions, etc. of the test target, and such as memories, system files, etc. of the terminal.

In the embodiment of the present application, the setting a monitoring point in the terminal and the test target in advance includes:
analyzing a cause of the crash of the test target in advance, to determine the key positions on which the test target might crash; and setting monitoring points on the key positions.

The crash of the test target is usually caused by a series of causes, and these causes may be led by the problems on some key positions in the test target or the terminal. Therefore, various kinds of causes which lead to the crash of the test target can be collected in advance, then the causes are analyzed, and the key positions on which the test target might crash can be determined by analyzing. Then, monitoring points are set on the key positions, so that the test target is monitored through the monitoring points at the key positions when the test target is running, and the operation condition of the test target is detected.

Wherein, the key position refers to a position where a crash occurs in the test target and a relevant position thereto. For example, if a crash occurs in an execution procedure of a process, a thread, a function calling, etc. of the test target, the process, the thread and the function calling can all referred to as a key position. And the key position is not limited to being within the test target. If the crash of the test target is caused due to the lack of the memory of the terminal, the key position is memory data of the terminal.

The step 102 is to monitor the operation of the test target, and when the test target crashes, acquire parameters of the monitoring points in the test target and parameter values thereof to generate a mirror file.

When software, i.e. the test target is running in the terminal, the operation of the test target is monitored, and when it is detected that the test target crashes, parameters of the monitoring points and parameter values of the parameters are acquired, and a mirror file is generated from the parameters of the monitoring points and the parameter values thereof. Since a number of monitoring points are set in the terminal and the software to be tested, the parameters and the parameter values of the number of the monitoring points can be included in the mirror file. Wherein, the parameters of the monitoring points include: the parameters of the monitoring points set in the test target and in the terminal.

Alternatively, the parameters of the monitoring points in the test target include state parameters of the monitoring points, the state parameters suitable to identify the state of the monitoring points when the test target crashes.

Wherein, the state parameters can be set in the monitoring points of the process, the thread and the function in the test target. Therefore, through the parameter values of the state parameters, the state can be known in which each process, thread and function, etc. are located when the test target crashes. For example, if the monitoring points are set in the main process of the test target, the state of the main process can be identified by the state parameters, and the state can include starting, running and ending, the parameter values of the corresponding state can respectively be 0, 1 and 2, and it can be known according to the parameter values, to which phase the main process has been executed.

Of course, other parameters are also included in the test target, such as the number of handles, the number of processes and the names of the processes and so on, which are all used to position and analyze of the cause of the crash. For example, it is analyzed whether the number of the handles reaches the upper limit of the system, in which process an exception occurs, and so on, wherein, the handle is an identifier which can identify an object or an item.

The parameters of the monitoring points in the terminal can include a total amount of the memory and a usage amount of the memory of the terminal. When the test target crashes, it can be known about the total amount of the memory and the usage amount of the memory in the terminal, and further known about the occupancy condition of the memory when crashing, so as to position the cause of the crash. Particularly, the crash of the test target may be caused by the problem of a non-test target per se, such as a crash caused due to the lack of the memory in the terminal, etc. Through the parameters of the monitoring points set in the terminal, the cause of the crash can be positioned quickly, especially for a crash caused by the problem of a non-test target per se.

Of course, other parameters can also be included in the terminal and the test target. The above described parameters are merely for enumeration and shall not be understood as limitation to the embodiments of the present application.

The step 103 is to acquire the mirror file and to view the parameters of the monitoring points in the mirror file and the parameter values thereof.

Then, the mirror file can be acquired. The mirror file needs to be opened by using a specific tool such as WinDbg, that is, the mirror file can be viewed through WinDbg. Then, the parameters of the monitoring points in the mirror file and the parameter values thereof can be acquired therefrom, including the parameters of the monitoring points in the terminal and the parameter values thereof, and the parameters of the monitoring points in the test target and the parameter values thereof.

The step 104 is to analyze the parameters of the monitoring points and the parameter values thereof, to position the cause of the crash of the test target.

After the parameters of the monitoring points and the parameter values thereof are acquired, the parameters of the monitoring points and the parameter values thereof can be analyzed. Since the parameters of the monitoring points in the terminal and the parameter values thereof, and the parameters of the monitoring points in the test target and the parameter values thereof are included therein, the parameters and parameter values thereof can be together analyzed, and the parameters and parameter values thereof can also be analyzed by classification. When analyzing, data that can be analyzed are very plentiful. Corresponding parameters and parameter values can be acquired from a number of monitoring points set in a number of terminals and software to be tested, and it is detected whether the parameter value of each parameter has exception, or it can be viewed through the parameter value, in what kind of state the monitoring points corresponding to that parameter are located, so as to position the cause of the crash of the test target.

Wherein, some crashes are not caused by the test target per se. For example, the crash of the test target is caused due to the lack of the memory. Since the parameters of the monitoring points in the terminals and the parameter values thereof can be acquired, data in the terminals than the test target can be analyzed, so that a crash that a non-test target per se causes can be positioned and the positioning of the cause of the crash can be ensured.

For example, in the above example, the parameter belongs to the monitoring point set in the main process of the test target and the parameter is the state parameter, and if the parameter value of that state parameter in the mirror file is 0 after the test target crashes, it is indicated that the main process is executed to a starting state, it is positioned that it occurs between the starting and the running, so individual processes, threads, functions, etc. of the test target between the starting and the running can be selectively analyzed, so as to position the cause of the crash quickly.

To sum up, the embodiment of the present application will set monitoring points in advance in terminals and a test target, for monitoring the operation of the test target, and when the test target crashes, acquire parameters of the monitoring points in the test target and parameter values thereof to generate a mirror file. Since a number of monitoring points can be set in the terminals and the software to be tested, a number of parameters and parameter values thereof can be acquired from the mirror file, so that when positioning the cause of the crash, more data can be analyzed, the data that can be analyzed are relatively adequate, so that the cause of the crash can be positioned quickly. And the parameters of the monitoring points in the terminals and the parameter values thereof can be acquired, therefore a crash caused by a non-test target per se also can be positioned, so that the positioning of the cause of the crash is ensured.

Secondly, the parameters of the monitoring points in the test target include state parameters of the monitoring points, the state parameters suitable to identify state of the monitoring points when the test target crashes. So through the state parameters, the state in which each process, thread, function, etc. are located when the test target crashes, can be acquired quickly, so that the location to be analyzed in the test target is positioned. And the parameters of the monitoring points in the terminal include a total amount of the memory and a usage amount of the memory, so it can be known about the occupancy condition of the memory when the test target crashes, so that it can be analyzed whether the crash is caused by a non-test target per se, such as a problem of lack of the memory, etc., so that the cause of the crash can be positioned further quickly.

Alternatively, analyzing the parameters of the monitoring points and the parameter values thereof, to position the cause of the crash of the test target includes: classifying the parameters of the monitoring points and analyzing the parameter values of individual parameters, to position the cause of the crash of the test target.

Since the monitoring points can be set in the terminal and also can be set in the test target, and the parameters of the monitoring points are of many types, the parameters of the monitoring points can be classified and then the parameter values of individual parameters are respectively analyzed in accordance with the result of the classification, to position the cause of the crash of the test target.

Alternatively, the mirror file further includes crash addresses, and the crash addresses are stack addresses of the processes of the test target, that is, storage locations of the process data are acquired.

Figure 2:
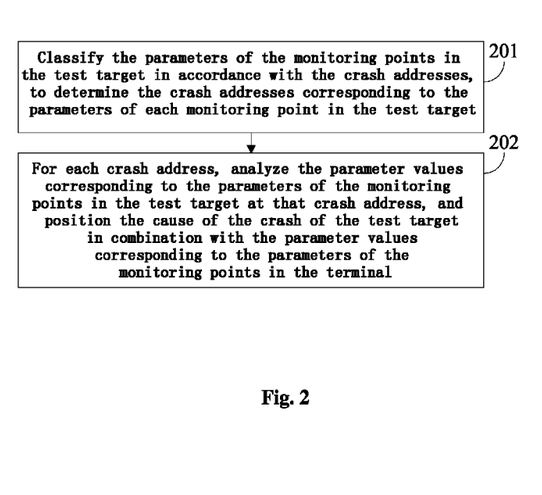
FIG. 2 shows a flowchart of a method for analyzing by classification provided according to another embodiment of the present application.

FIG. 2 shows a flowchart of a method for analyzing by classification provided according to another embodiment of the present application.

The classifying the parameters of the monitoring points and analyzing the parameter values of individual parameters, to position the cause of the crash of the test target, includes:

a step 201 of classifying the parameters of the monitoring points in the test target in accordance with the crash addresses, to determine the crash addresses corresponding to the parameters of each monitoring point in the test target.

Firstly, for the parameters of the monitoring points in the test target, the parameters of the monitoring points in the test target can be classified in accordance with the crash addresses, to determine the crash addresses corresponding to the parameters of each monitoring point in the test target, that is, to determine the process to which the parameters of each monitoring point in the test target belong.

a step 202 of, for each crash address, analyzing the parameter values corresponding to the parameters of the monitoring points in the test target at that crash address, and positioning the cause of the crash of the test target in combination with the parameter values corresponding to the parameters of the monitoring points in the terminal.

Then, for each crash address, the parameter values corresponding to the parameters of the monitoring points in the test target at that crash address are to be analyzed. It can be determined through the parameter values which parameter has exception, and it can also be analyzed in what kind of state the process, the thread and the function are located when the software crashes. When analyzing, in addition to the analysis of the monitoring points in the test target, the cause of the crash of the test target is to be further determined, in combination with the parameter values corresponding to the parameters of the monitoring points in the terminal, such as the total amount of the memory and the usage amount of the memory, etc.

To sum up, the embodiment of the present application can classify the parameters of the monitoring points in the test target in accordance with the crash addresses, and then when analyzing the parameters of the monitoring points in the test target at individual crash address, in combination with the parameters of the monitoring points in the terminal, analysis is performed together, so that not only the crash caused by the test target, but also the crash caused by the terminals can be positioned quickly.

In the embodiment of the present application, the test target can be various kinds of software in a terminal, such as office software, game software, a browser, system software, etc. In the following, the contents of the embodiment of the present application will be set forth by exemplifying the browser as the test target.

Figure 3:
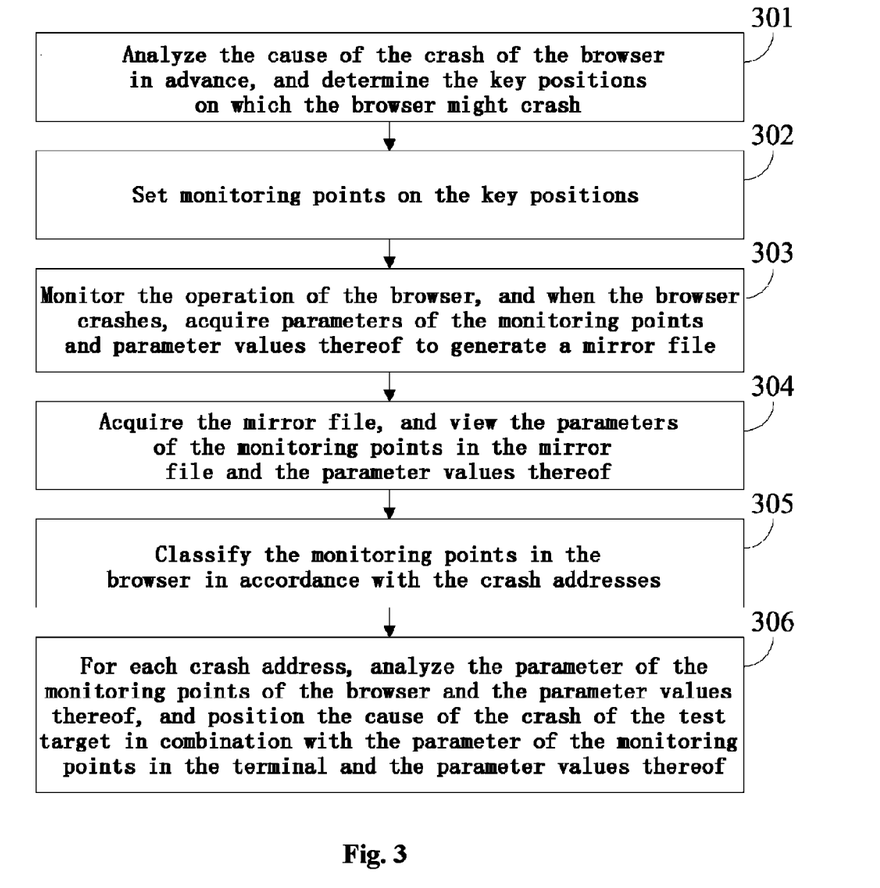
FIG. 3 shows a flowchart of a method for positioning the crash of a browser provided by another embodiment of the present application.

FIG. 3 shows a flowchart of a method for positioning the crash of a browser provided by another embodiment of the present application.

The step 301 is to analyze the cause of the crash of the browser in advance, and to determine the key positions on which the browser might crash.

Generally, the crash of the browser does not occur suddenly, rather is led by some causes, such as the lack of the memory, the failure of the function calling in the browser, etc. And these causes may be led by the problems of certain key positions in the test target or the terminal. For example, the lack of the memory is related to the memory data in the terminal, and the failure of the function calling is the problem of the function calling in the browser.

Therefore, various kinds of causes which cause the crash of the test target can be collected in advance, then the causes are analyzed, and the key positions on which the test target might crash can be determined by analyzing. Then, monitoring points are set on the key positions, so that the test target is monitored through the monitoring points at the key positions when the test target is running, and the operation condition of the test target is detected. Wherein, the key positions include at least one item of the following: the process, the thread, the function of the browser and the memory data of the terminal where the browser is located.

The step 302 is to set monitoring points on the key positions.

The monitoring points are set on the key positions. For example, the monitoring points are set in individual processes, individual threads, functions of individual classes and the relevant positions of the function calling, etc. of the browser. The monitoring points can also be set in the terminal where the browser is located. For example, the monitoring points are set in the memory data, data for CPU running, etc. Therefore, the operation conditions of the browser and the terminal when the browser is running are comprehensively monitored.

The step 303 is to monitor the operation of the browser, and when the browser crashes, to acquire parameters of the monitoring points and parameter values thereof to generate a mirror file.

Then, when the browser is running, the operation of the browser can be monitored through the monitoring points. When it is detected that the browser crashes, parameters of individual monitoring points in the browser and parameter values thereof can be acquired, so that a mirror file is generated from the parameters of the monitoring points and the parameter values thereof.

The step 304 is to acquire the mirror file, and to view the parameters of the monitoring points in the mirror file and the parameter values thereof.

Then, the mirror file can be acquired and the mirror file is opened by using a specific tool such as WinDbg, to view the parameters of the monitoring points in the mirror file and the parameter values thereof.

The step 305 is to classify the monitoring points in the browser in accordance with the crash addresses.

The monitoring points in the browser belong to various crash addresses respectively, and the crash addresses are stack addresses of the processes of the browser, that is, storage positions of process data are acquired. Therefore, the monitoring points in the browser can be classified in accordance with the crash addresses, to determine the crash addresses corresponding to the parameters of each monitoring point in the test target.

The step 306 is to, for each crash address, analyze the parameter of the monitoring points of the browser and the parameter values thereof, and to position the cause of the crash of the test target in combination with the parameter of the monitoring points in the terminal and the parameter values thereof.

Then, for each crash address, the parameter values corresponding to the parameters of the monitoring points in the browser at that crash address are to be analyzed. It can be determined through the parameter values which parameter has exception, and it can also be analyzed in what kind of state the process, the thread and the function are located when the browser crashes. When analyzing, in addition to the analysis of the monitoring points in the browser, the cause of the crash of the test target is to be further determined, in combination with the parameter values corresponding to the parameters of the monitoring points in the terminal, such as the total amount of the memory and the usage amount of the memory, etc.

For example, in the crashes, there is a kind of crash caused due to the failure of the application of the memory by a malloc function. When analyzing the mirror file, after classification in accordance with the crash addresses, after the parameter values corresponding to the parameters of the monitoring points in the browser can be analyzed, it can be determined that the calling of the malloc function fails. However, through the parameters of the monitoring points in the browser, the specific cause of the crash is not analyzed. By combining the parameter values corresponding to the parameters of the monitoring points in the terminal, it is found that the total amount of the memory is very small and the occupancy rate of the memory is very high, and it is positioned in turn that the cause of the crash is that the memory in the terminal is too small, and the crash is not caused by the problem of the browser itself.

As another example, in the crashes, there is also a kind of crash being CreateBitmap or Create, and frequent failure of a function relating to the system handle. Through the mirror file, the parameter values of the parameters at individual crash addresses can be viewed, so as to view the number of all the handles, and by combining the parameter values corresponding to the parameters of the monitoring points in the terminal, it is analyzed in turn that, the crash is due to the number of the handles reaching the upper limit of the system in the terminal, and the reason why that problem is cause is due to the lack of the system resources.

As another example, state parameters are added in the monitoring points of the browser, so that the state in which the browser is located when crashing can be determined, and the seriousness of the problem can be determined quickly. If the crash occurs when starting, it results in that the user cannot use it, the problem of which is relatively serious, and it is needed to analyze and position the cause of the crash as quickly as possible, so as to minimize the inconvenience to the user. If the crash occurs when ending, the usage of the user has finished, the seriousness of the problem is relatively lower. Of course, it is also needed to analyze and position the cause of the crash as quickly as possible, so as to minimize the inconvenience to the user.

The embodiment of the present application can adopt dbghelp.dll to monitor the test target, the dbghelp.dll is a kind of debug trace related module suitable to track the process of work, which, when the test target crashes, collects stack information when exception occurs in the program, to be provided for developers to analyze, so as to find the cause why exception occurs in the process.

MiniDumpWriteDump is an API (Application Programming Interface) in the DbgHelp.dll, suitable to export a DUMP file of the software which is currently running, i.e. a mirror file. There is a parameter MINIDUMP_USER_STREAM in the MiniDumpWriteDump, and this parameter is an interface parameter, i.e. a monitoring interface, which allows a user to add a parameter set by himself/herself. And when the test target crashes, the parameter values corresponding to the parameter set by himself/herself can be acquired through the parameter MINIDUMP_USER_STREAM, then the parameter and parameter values are added into the mirror file, to perform further analysis.

Figure 4:
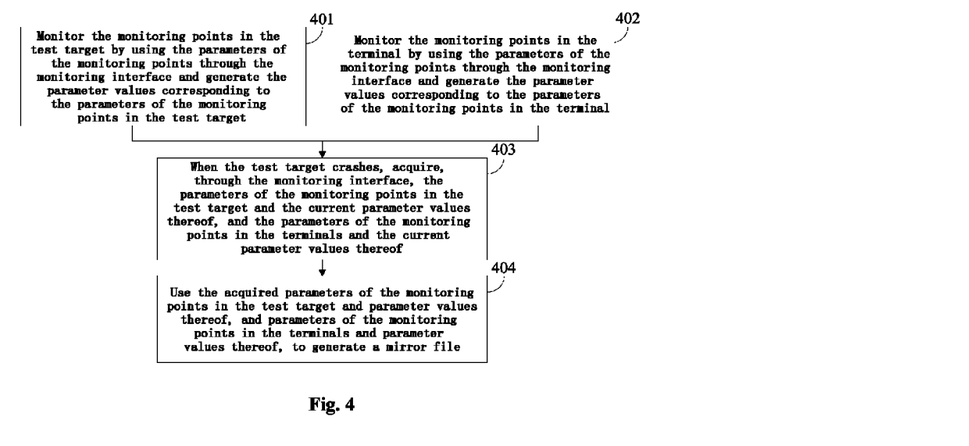
FIG. 4 shows a flowchart of a method for monitoring and generating a mirror file provided according to another embodiment of an embodiment of the present application.

FIG. 4 shows a flowchart of a method for monitoring and generating a mirror file provided according to another embodiment of the present application.

Monitoring the operation of the test target in the terminal, and when the test target crashes, acquiring the parameter of the monitoring points and the parameter values thereof to generate a mirror file, which specifically include:

a step 401 of monitoring the monitoring points in the test target by using the parameters of the monitoring points through the monitoring interface and generating the parameter values corresponding to the parameters of the monitoring points in the test target.

The embodiment of the present application set the monitoring points in the test target. Therefore, when the test target is running, the monitoring points in the test target can be monitored through the monitoring interface by using the parameters of the monitoring points. That is, along with the operation of the test target, corresponding parameter values can be generated by the parameters of the monitoring points in the test target, and the parameter values can identify the information of the monitoring points such as the state in which it is located, the position where it is executed, etc.

a step 402 of monitoring the monitoring points in the terminal by using the parameters of the monitoring points through the monitoring interface and generating the parameter values corresponding to the parameters of the monitoring points in the terminal.

The embodiment of the present application set the monitoring points in the terminal as well. Therefore, when the test target is running, the monitoring points in the terminal can be monitored by using the parameters of the monitoring points through the monitoring interface. That is, along with the operation of the test target, corresponding parameter values can be generated by the parameters of the monitoring points in the terminal, and the parameter values can identify the information of the monitoring points, such as the state in which that monitoring point in the terminal is located, the usage condition of that monitoring point in the terminal, etc.

a step 403 of, when the test target crashes, acquiring, through the monitoring interface, the parameters of the monitoring points in the test target and the current parameter values thereof, and the parameters of the monitoring points in the terminals and the current parameter values thereof.

When the test target crashes, the dbghelp.dll can detect the event of the crash of the test target. When the test target crashes, the dbghelp.dll will, depending on the parameters set therein, collect the data when exception occurs in the test target, such as stack information, etc. In addition, the dbghelp.dll also can, through the parameter MINIDUMP_USER_STREAM, collect respectively the parameters of the monitoring points set in the terminals and the current parameter values thereof, i.e. the parameter values thereof when the test target crashes, and collect the parameters of the monitoring points set in the test target and the current parameter values thereof.

a step 404 of using the acquired parameters of the monitoring points in the test target and parameter values thereof, and parameters of the monitoring points in the terminals and parameter values thereof, to generate a mirror file.

After acquiring the parameters of the monitoring points in the test target and the current parameter values thereof, the parameters of the monitoring points in the terminals and the current parameter values thereof, and the data when the exception occurs in the test target, the dbghelp.dll can export the above data through the MINIDUMP_USER_STREAM, and generate the mirror file.

In actual processing, the method of the embodiments of the present application can be implemented by a terminal and a server together. The above steps in FIG. 3 can be implemented in the terminal. After a mirror file is generated in the terminal, it can be uploaded to the server. After receiving the mirror file, the server can execute the following steps of viewing and analyzing.

Of course, automatic analysis software can also be integrated, which monitors the operation of the test target and positions the cause of the crash in the terminal, and which can return the cause of the crash to the server. Wherein, for a crash caused by a non-test target per se, corresponding advices can be provided to the user. For a crash caused by the problem in the test target, the cause of the crash can be returned and it can be repaired by a developer.

Of course, the server can also be used to perform remote monitoring and to return data to generate a mirror file and perform analysis, which is not limited by the embodiments of the present application.

Figure 5:
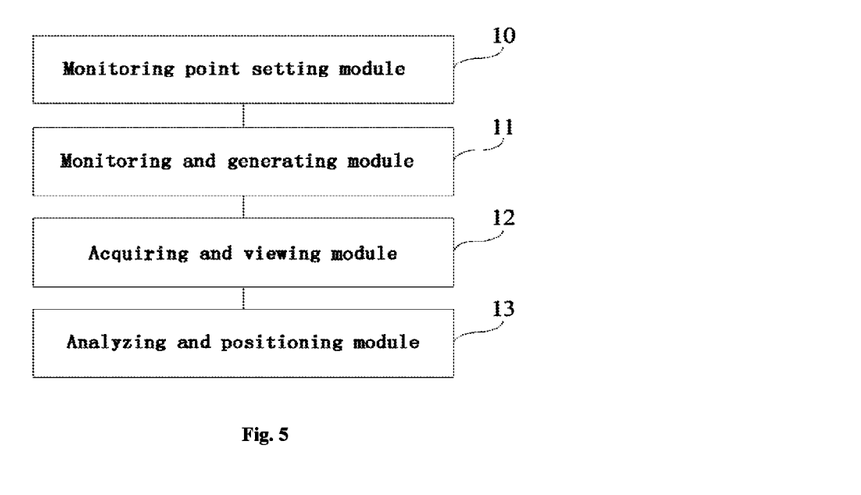
FIG. 5 shows a structural diagram of an apparatus for positioning crash provided according to an embodiment of the present application.

FIG. 5 shows a structural diagram of an apparatus for positioning crash provided according to an embodiment of the present application.

Accordingly, the embodiment of the present application also provides an apparatus for positioning crash, which includes a monitoring point setting module 10, a monitoring and generating module 11, an acquiring and viewing module 12 and an analyzing and positioning module 13, wherein:

The monitoring point setting module 10 is configured to set monitoring points in a test target and a terminal in advance; the monitoring and generating module 11 is configured to monitor the operation of the test target, and when the test target crashes, acquire parameters of the monitoring points and parameter values thereof to generate a mirror file, the parameters of the monitoring points including the parameters of the monitoring points in the test target and in the terminal; the acquiring and viewing module 12 is configured to acquire the mirror file and view the parameters of the monitoring points in the mirror file and the parameter values thereof; the analyzing and positioning module 13 is configured to analyze the parameters of the monitoring points and the parameter values thereof, to position the cause of the crash of the test target.

Figure 6:
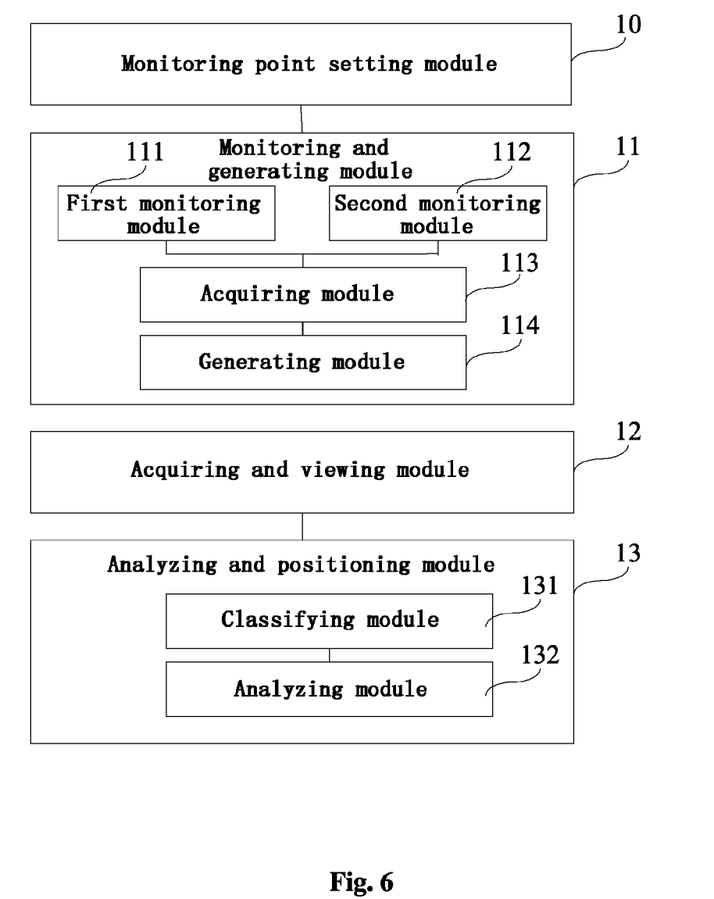
FIG. 6 shows a structural diagram of an apparatus for positioning a crash provided according to another embodiment of the present application.

FIG. 6 shows a structural diagram of an apparatus for positioning crash provided according to another embodiment of the present application.

Alternatively, the analyzing and positioning module 13 is configured to classify the parameters of the monitoring points and analyze the parameter values of individual parameters, to position the cause of the crash of the test target.

Alternatively, the mirror file further includes crash addresses, the analyzing and positioning module 13 includes: a classifying module 131 configured to classify the parameters of the monitoring points in the test target in accordance with the crash addresses, to determine the crash addresses corresponding to the parameters of each monitoring points in the test target; an analyzing module 132 configured to, for each crash address, analyze the parameter values corresponding to the parameters of the monitoring points in the test target at that crash address, and to position the cause of the crash of the test target in combination with the parameter values corresponding to the parameters of the monitoring points in the terminal.

Alternatively, the monitoring and generating module 11 includes: a first monitoring module 111 configured to monitor the monitoring points in the test target by using the parameters of the monitoring points through a monitoring interface and generate the parameter values corresponding to the parameters of the monitoring points in the test target; a second monitoring module 112 configured to monitor the monitoring points in the terminal by using the parameters of the monitoring points through the monitoring interface and generate the parameter values corresponding to the parameters of the monitoring points in the terminal; an acquiring module 113 configured to, when the test target crashes, acquire, through the monitoring interface, the parameters of the monitoring points in the test target and the current parameter values thereof, and the parameters of the monitoring points in the terminals and the current parameter values thereof; a generating module 114 configured to use the acquired parameters of the monitoring points in the test target and parameter values thereof, and parameters of the monitoring points in the terminals and parameter values thereof, to generate the mirror file.

Alternatively, the monitoring point setting module 10 is specifically configured to analyze the cause of the crash of the test target in advance, determine the key positions on which the test target might crash, and set monitoring points on the key positions.

Alternatively, the test target is a browser, then the monitoring point setting module 10 is specifically configured to analyze the cause of the crash of the browser in advance, determine the key positions on which the browser might crash, and set monitoring points on the key positions, the key positions include at least one item of the following: the process, the thread, the function of the browser and the memory data of the terminal where the browser is located.

Alternatively, the test target is a browser, and the mirror file further includes crash addresses; in the analyzing and positioning module 13: the classifying module 131 is specifically configured to classify the monitoring points in the browser in accordance with the crash addresses; the analyzing module 132 is specifically configured to, for each crash address, analyze the parameters of the monitoring points of the browser and the parameter values thereof, and to position the cause of the crash of the test target in combination with the parameters of the monitoring points in the terminal and the parameter values thereof.

Alternatively, the parameters of the monitoring points in the test target include state parameters of the monitoring points suitable to identify state of the monitoring points when the test target crashes, and the parameters of the monitoring points in the terminal include a total amount of the memory and a usage amount of the memory of the terminal.

Accordingly, an embodiment of the present application further provides a computer-readable recording medium on which a program for executing the method for positioning a crash described in above embodiments is recorded. Said computer-readable recording medium includes any mechanisms for storing or transmitting information in a computer-readable form. For example, a machine-readable medium includes a read-only memory (ROM), a random access memory (RAM), a magnetic disk storage medium, an optical storage medium, a flash memory medium, an electrical, optical, acoustical or another form of propagating signals (e.g., a carrier waves, an infrared signal, a digital signals, etc.), etc.

The algorithm and display provided here are not inherently related to any particular computer, virtual system or other devices. Various general purpose systems can also be used together with the teaching based thereon. According to the above description, the structure required to construct this kind of system is obvious. Furthermore, the present application is not directed to any particular programming languages. It is to be understood, that the contents of the present application described here can be implemented by using various programming languages, and the description above made for a particular language is for the purpose of disclosure of the preferred embodiment of the present application.

A large number of specific details are described in the specification provided herein. However, it can be understood, that the embodiments of the present application can be implemented without these specific details. In some instances, the methods, structures and techniques that are well known are not showed in detail, so as not to obscure the understanding of this specification.

Similarly, it is to be understood, that to simplify the disclosure and help to understand one or more of respective inventive aspects, in the above description of the exemplary embodiments of the present application, respective features of the present application sometimes are together grouped into a single embodiment, figure or the description therefor. However, the disclosed method shall not be construed as reflecting an intention that the present application claimed requires more features than those explicitly recorded in each claim. More specifically, as reflected in the following claims, inventive aspects lie in that they are less than all features of a single embodiment disclosed previously. Therefore, claims following the specific embodiment are hereby explicitly incorporated in this specific embodiment, wherein each claim itself serves as a separate embodiment of the present application.

It can be understood by those skilled in the art that, the modules in the device in an embodiment can be adaptively changed and provided in one or more devices different from the embodiment. The modules or units or components in an embodiment can be combined to one module or unit or component, and further they can be divided into a plurality of submodules or subunits or subcomponents. Except that at least some of such features and/or procedures or units are mutually exclusive, any combination can be used to combine all features disclosed in the present specification (including the accompanying claims, abstract and drawings) and any method so disclosed or all procedures or units of the device. Unless otherwise explicitly stated, every feature disclosed in the present specification (including the accompanying claims, abstract and drawings) can be replaced by alternative features providing the same, equivalent or similar purpose.

Furthermore, it can be understood by those skilled in the art that, although some embodiments described herein include certain features included in other embodiments rather than other features, the combination of the features of the different embodiments means being within the scope of the present application and form different embodiments. For example, in the following claims, any one of the embodiments claimed can be used in any combination.

The respective components of the embodiments of the present application can be implemented in hardware, or implemented in a software module running on one or more processor, or implemented in combination thereof. It should be understood by those skilled in the art, that in practice a microprocessor or a digital signal processor (DSP) can be used to implement some or all functions of some or all components in the apparatus for positioning crash according to the embodiments of the present application. The present application can also be implemented as a device or apparatus program (e.g., a computer program and a computer program product) for executing some of all of the method described here. Such a program for implementing the present application can be stored on a computer readable medium or can have a form of one or more signal. Such a signal can be downloaded from an Internet website or provided on a carrier signal or provided in any other form.

It should be noted that, the above described embodiments are used for explaining the present application, rather than limiting the present application, and an alternative embodiment can be designed by those skilled in the art without departing from the scope of the appended claims. In the claims, any reference symbol positioned between parentheses should not be considered the limiting of the claims. The word "include" does not exclude the existence of an element or a step that is not described in the claims. The word "a" or "an" positioned before an element does not exclude the existence of a plurality of such element. The present application can be implemented by way of a hardware including several different elements and by way of a computer suitably programmed. In a unit claim enumerating several apparatuses, several of these apparatuses can be specifically implemented by the same hardware. The use of the word "first", "second" and "third", etc. does not represent any sequence. These words can be construed as a name.

What is claimed is:

1. A method for positioning a crash, comprising:
setting monitoring points in a terminal and a test target in advance, wherein the test target is a browser;
monitoring an operation of the test target, and only when the test target crashes, acquiring parameters of the monitoring points and parameter values thereof to generate a mirror file, the parameters of the monitoring points including the parameters of the monitoring points in the test target and in the terminal;
acquiring the mirror file and viewing the parameters of the monitoring points in the mirror file and the parameter values thereof; and
analyzing the parameters of the monitoring points and the parameter values thereof, to position a cause of the crash of the test target; wherein
the analyzing the parameters of the monitoring points and the parameter values thereof, to position the cause of the crash of the test target includes:

classifying the parameters of the monitoring points and analyzing the parameter values of individual parameters, to position the cause of the crash of the test target; the mirror file further includes crash addresses;

the classifying the parameters of the monitoring points and analyzing the parameter values of individual parameters, to position the cause of the crash of the test target includes:

classifying the parameters of the monitoring points in the test target in accordance with the crash addresses, to determine the crash addresses corresponding to the parameters of each monitoring point in the test target; and analyzing, for each crash address corresponding to the parameters of each monitoring point in the test target, the parameter values corresponding to the parameters of the monitoring points in the test target at the crash address, and positioning the cause of the crash of the test target in combination with the parameter values corresponding to the parameters of the monitoring points in the terminal.

2. The method according to claim 1, wherein the monitoring the operation of the test target in the terminal includes:

monitoring the monitoring points in the test target by using the parameters of the monitoring points through a monitoring interface and generating the parameter values corresponding to the parameters of the monitoring points in the test target; and monitoring the monitoring points in the terminal by using the parameters of the monitoring points through the monitoring interface and generating the parameter values corresponding to the parameters of the monitoring points in the terminal.

3. The method according to claim 2, wherein when the test target crashes, the acquiring parameters of the monitoring points and parameter values thereof to generate a mirror file includes:

only when the test target crashes, acquiring, through the monitoring interface, the parameters of the monitoring points in the test target and the parameter values thereof, and the parameters of the monitoring points in the terminal and the parameter values thereof; and using the acquired parameters of the monitoring points in the test target and parameter values thereof, and parameters of the monitoring points in the terminal and parameter values thereof, to generate the mirror file.

4. The method according to claim 1, wherein the setting monitoring points in the terminal and the test target in advance includes:

analyzing the cause of the crash of the test target in advance, to determine key positions on which the test target might crash; and setting monitoring points on the key positions.

5. The method according to claim 4, wherein the test target is a browser, wherein the setting monitoring points in the terminal and the test target in advance includes:

analyzing the cause of the crash of the browser in advance, to determine the key positions on which the browser might crash; and setting monitoring points on the key positions, the key positions including at least one of: a process, a thread, a function of the browser, and memory data of the terminal where the browser is located.

6. The method according to claim 1, wherein the analyzing the parameters of the monitoring points and the parameter values thereof, to position the cause of the crash of the test target includes:

classifying the monitoring points in the browser in accordance with the crash addresses; and analyzing, for each crash address, the parameters of the monitoring points of the browser and the parameter values thereof, and positioning the cause of the crash of the test target in combination with the parameters of the monitoring points in the terminal and the parameter values thereof.

7. The method according to claim 1, wherein the parameters of the monitoring points in the test target include state parameters of the monitoring points suitable to identify a state of the monitoring points when the test target crashes, and the parameters of the monitoring points in the terminal include a total amount of a memory and a usage amount of the memory of the terminal.

8. An apparatus for positioning a crash, comprising a memory having instructions stored thereon and at least one processor to execute the instructions to cause:

setting monitoring points in a test target and a terminal in advance, wherein the test target is a browser;

monitoring an operation of the test target, and only when the test target crashes, acquiring parameters of the monitoring points and parameter values thereof to generate a mirror file, the parameters of the monitoring points including the parameters of the monitoring points in the test target and in the terminal;

acquiring the mirror file and viewing the parameters of the monitoring points in the mirror file and the parameter values thereof;

analyzing the parameters of the monitoring points and the parameter values thereof, to position a cause of the crash of the test target; and classifying the parameters of the monitoring points and analyzing the parameter values of individual parameters, to position the cause of the crash of the test target; wherein:

the mirror file further includes crash addresses; the crash addresses are stack addresses of processes of the browser, and the classifying the parameters of the monitoring points and analyzing the parameter values of individual parameters, to position the cause of the crash of the test target includes:

classifying the parameters of the monitoring points in the test target in accordance with the crash addresses, to determine the crash addresses corresponding to the parameters of each monitoring point in the test target;

analyzing for each crash address corresponding to the parameters of each monitoring point in the test target, the parameter values corresponding to the parameters of the monitoring points in the test target at the crash address, and positioning the cause of the crash of the test target in combination with the parameter values corresponding to the parameters of the monitoring points in the terminal.

9. The apparatus according to claim 8, wherein the monitoring the operation of the test target in the terminal includes:

monitoring the monitoring points in the test target by using the parameters of the monitoring points through a monitoring interface and generating the parameter values corresponding to the parameters of the monitoring points in the test target; and monitoring the monitoring points in the terminal by using the parameters of the monitoring points through the monitoring interface and generating the parameter values corresponding to the parameters of the monitoring points in the terminal.

10. The apparatus according to claim 9, wherein:

when the test target crashes, the acquiring parameters of the monitoring points and parameter values thereof to generate a mirror file includes: acquiring, through the monitoring interface, the parameters of the monitoring points in the test target and the parameter values thereof, and the parameters of the monitoring points in the terminal and the parameter values thereof; and using the acquired parameters of the monitoring points in the test target and parameter values thereof, and parameters of the monitoring points in the terminal and parameter values thereof, to generate the mirror file.

11. The apparatus according to claim 8, wherein the setting monitoring points in the terminal and the test target in advance includes:

analyzing the cause of the crash of the test target in advance, determining key positions on which the test target might crash, and setting monitoring points on the key positions.

12. The apparatus according to claim 11, wherein the setting monitoring points in the terminal and the test target in advance includes:

analyzing the cause of the crash of the browser in advance, determining the key positions on which the browser might crash, and setting monitoring points on the key positions, the key positions including at least one of: a process, a thread, a function of the browser and memory data of the terminal where the browser is located.

13. The apparatus according to claim 8, wherein the analyzing the parameters of the monitoring points and the parameter values thereof, to position the cause of the crash of the test target includes:

classifying the monitoring points in the browser in accordance with the crash addresses;

analyzing for each crash address, the parameters of the monitoring points of the browser and the parameter values thereof; and positioning the cause of the crash of the test target in combination with the parameters of the monitoring points in the terminal and the parameter values thereof.

14. The apparatus according to claim 8, wherein the parameters of the monitoring points in the test target include state parameters of the monitoring points suitable to identify a state of the monitoring points when the test target crashes, and the parameters of the monitoring points in the terminal include a total amount of the memory and a usage amount of the memory of the terminal.

15. A non-transitory computer readable medium having instructions stored thereon that, when executed by at least one processor, cause the at least one processor to perform operations for positioning a crash, which comprises the steps of:

setting monitoring points in a terminal and a test target in advance, wherein the test target is a browser;

monitoring an operation of the test target, and only when the test target crashes, acquiring parameters of the monitoring points and parameter values thereof to generate a mirror file, the parameters of the monitoring points including the parameters of the monitoring points in the test target and in the terminal;

acquiring the mirror file and viewing the parameters of the monitoring points in the mirror file and the parameter values thereof; and analyzing the parameters of the monitoring points and the parameter values thereof, to position the cause of the crash of the test target.

* * * * *